United States Patent [19]
Benson

[11] 3,881,763
[45] May 6, 1975

[54] CHUCK
[75] Inventor: Norman E. Benson, Naugatuck, Conn.
[73] Assignee: Electrostatic Equipment Corporation, New Haven, Conn.
[22] Filed: June 3, 1974
[21] Appl. No.: 475,523

[52] U.S. Cl................ 294/116; 214/1 BA; 279/37; 294/115
[51] Int. Cl.............................................. B26f 3/00
[58] Field of Search.......... 214/1 BA; 294/115, 116, 294/87 R, 87.22; 279/37, 1 Q

[56] References Cited
UNITED STATES PATENTS

| | | | |
|---|---|---|---|
| 2,213,774 | 9/1940 | Taylor | 214/1 BA |
| 3,108,835 | 10/1963 | Rowekamp | 294/116 |
| 3,295,883 | 1/1967 | Dupuy et al. | 294/116 |
| 3,731,862 | 5/1973 | Bustraan et al. | 214/1 BA |

Primary Examiner—Robert J. Spar
Assistant Examiner—Lawrence J. Oresky

[57] ABSTRACT

A chuck-type device is provided which is responsive to force in a single direction to automatically engage and also release an article. Inward movement of a positioning member permits the gripping elements to assume an open position; further inward movement positions a setting member in such a way as to provide a continuous camming surface, which is engaged by a follower element to effect the closure of the gripping elements. The actuating movement may be brought about by the force of an article bearing upon the actuating member of the device.

9 Claims, 10 Drawing Figures

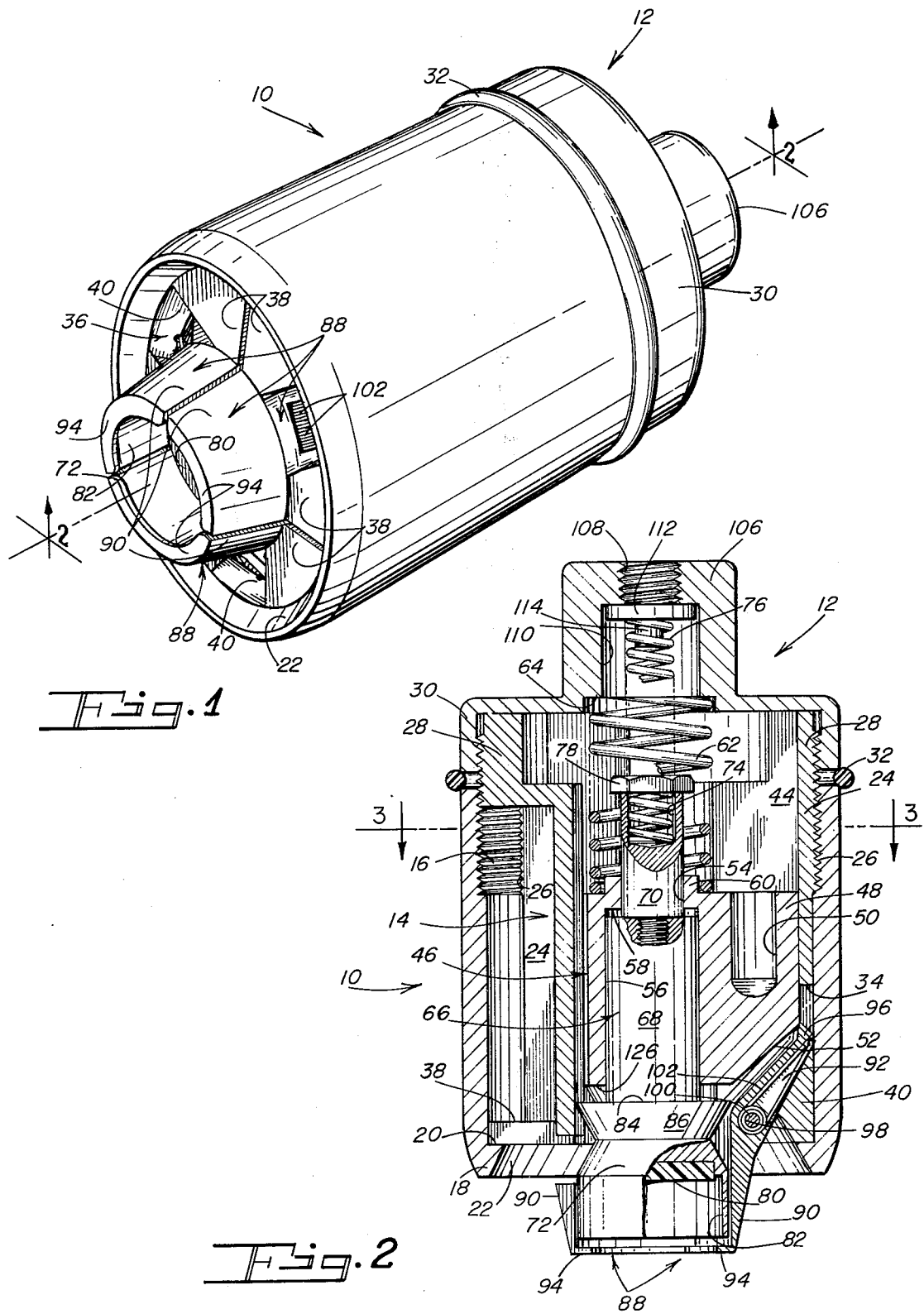

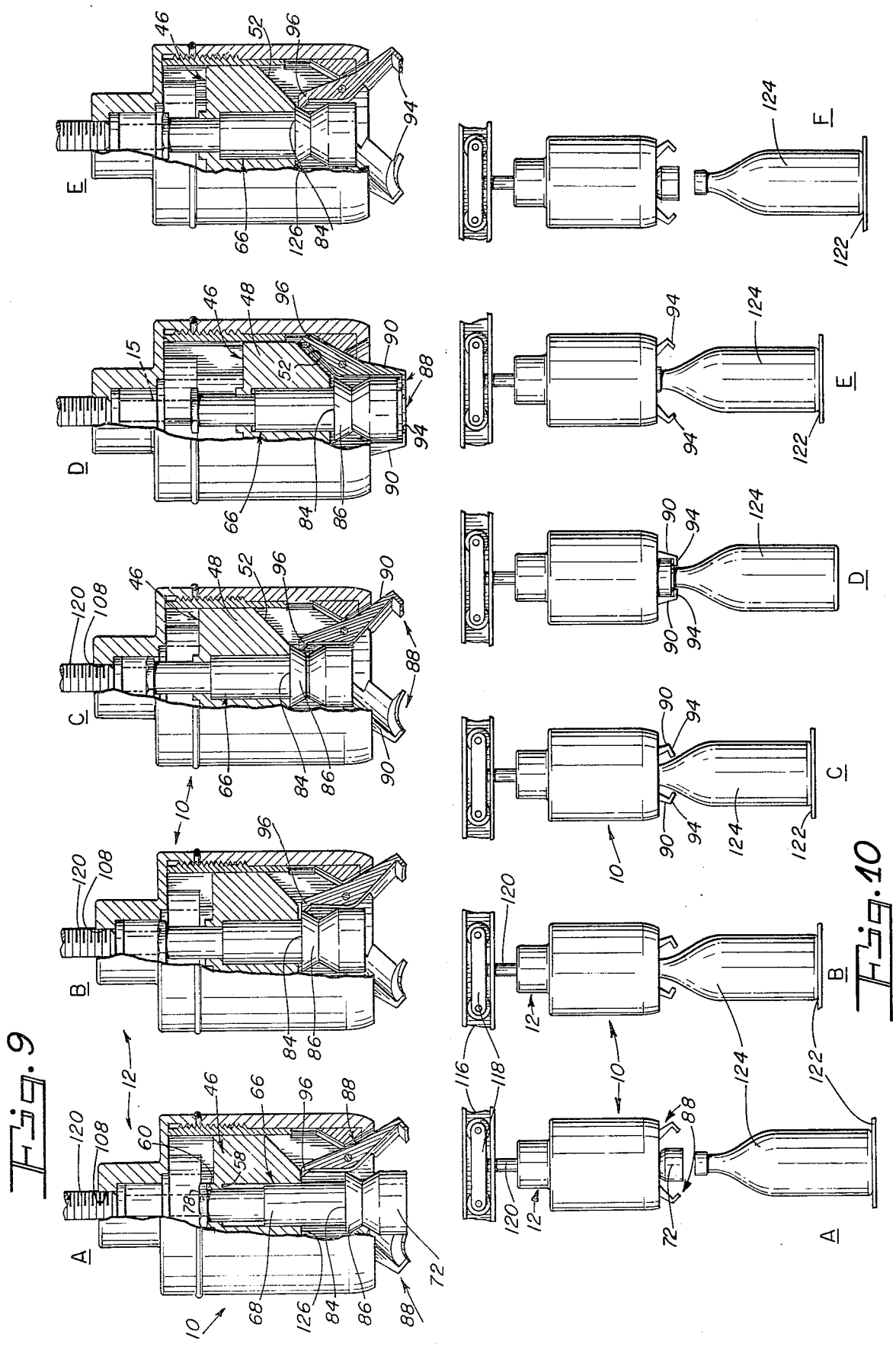

CHUCK

BACKGROUND OF THE INVENTION

It is often desirable to transport articles by suspending them from an overhead conveyor. As a practical matter, when large volumes of articles are involved, such a conveyor must be automatically loaded and unloaded. Since upstanding articles (e.g., bottles and the like) are transported with great facility simply by depositing them upon the upper surface of a belt or similar type of underlying conveyor, the need arises for means by which the automatic transfer between overhead and underlying conveyors may be readily effected.

The timing and other control factors involved in such transfer operations are simplified by the use of an engaging mechanism on the overhead conveyor that is actuated by the article itself, and considerations of cost, reliability and design complexity favor a mechanically responsive mechanism. However, since an underlying conveyor is capable of exerting only upward force upon the articles supported thereon, if the transfer is to occur both to and from such a conveyor, the engaging mechanism must respond to force in a single direction, to effect both engagement and also release.

Accordingly, it is an object of the present invention to provide a novel chuck-type device which is responsive to force in a single direction to effect both engagement and release of an article thereby.

It is also an object of the invention to provide such a device which is especially adapted to securely suspend a bottle or similar container, while effectively sealing the opening of such a container against contamination.

Another object is to provide a novel chuck which is adapted for mounting on an overhead conveyor to automatically accept upstanding articles from an underlying supporting surface, and to thereafter release them thereto.

Still another object is to provide a chuck of the foregoing type which is itself substantially sealed against the entry of contaminants and foreign objects thereinto.

A further object is to provide a devide having the foregoing features and advantages which is, in addition, simple and inexpensive to construct, and convenient and economical to employ.

SUMMARY OF THE DISCLOSURE

It has now been found that the foregoing and related objects of the invention are readily attained in a chuck-like device comprising, in combination: a body, an outwardly biased actuating member having outwardly disposed article-engaging means thereon, at least one gripping member. The actuating member is mounted for reciprocation between outward and inward positions relative to the body, and it has means for engaging and moving inwardly the positioning member and the setting member, upon inward movememt thereof. The gripping member is mounted on the body for pivotable movement about an axis generally perpendicular to the axis of reciprocation of the actuating member. It has a gripping element thereon, which is disposed outwardly of its axis of pivoting for movement between an open position away from the article-engaging means of the actuating member, and a closed position adjacent thereto; the gripping member is biased toward the open position of the gripping element. It also has thereon a follower element, which is spaced inwardly of the axis of pivoting.

The positioning member is mounted for reciprocation between outward and inward positions. It has an outwardly tapered first camming surface which is disposed to engage the follower element of the gripping member and to urge the gripping element thereof into its closed position, the positioning member then being in its outward position. The setting member is mounted, for inward and outward reciprocation, outwardly of the positioning member; it has an outwardly tapered second camming surface which is also disposed to engage the follower elements of the gripping member, and which is generally contiguous to the first camming surface when the positioning member and the setting member are adjacently disposed. When contiguous, the camming surfaces are adapted to permit the follower element to pass readily from the second to the first.

Consequently, when the positioning member and gripping element are in their outward and closed positions, respectively, inward movement of the actuating member to a first position from its outward position causes engagement and inward position causes engagement and inward movement of the positioning member and the setting member, which in turn permits the gripping member to pivot the gripping element to the open position thereof. Further inward movement of the positioning member and the setting member, by movement of the actuating member to a second, further inward position thereof, causes the follower element to engage and bear upon the second camming surface. Outward movement of the actuating member will then permit the positioning member to return to its outward position; the follower element will thereupon pass readily from the second to the first camming surface, with the gripping element ultimately returning to the closed position thereof.

In the preferred embodiments, the device includes a plurality of gripping members, with the first and second camming surfaces being disposed to engage the follower elements of each such member. The follower elements are desirably directed toward the axis of reciprocation of the actuating member, and they may be pointed to facilitate entry between the camming surfaces. In the open position of the gripping element, the gripping member desirably rests upon the body of the chuck, and is restrained thereby. Advantageously, the positioning member rests upon the follower elements in the open position of the gripping element, with the engaging and moving means of the actuating member being disposed to engage and move the positioning member, to release the gripping member, prior to the setting member moving past the follower element.

Most desirably, the article-engaging means is disposed at the outer end of the actuating member, with the gripping elements in their closed position extending below the article-engaging means and toward the axis of reciprocation. When the article to be engaged is an open-ended container, it is advantageous for the article-engaging means to include a resiliently-deformable element, disposed outwardly thereon and adapted to seal the container. The positioning and setting members are preferably slidably mounted upon the actuating member, and most preferably each is of circular cross section.

BRIEF DESCRIPTION OF THE DRAWINGS

FIG. 1 is a perspective view of a chuck embodying the present invention, with the gripping members thereof in closed position;

FIG. 2 is a sectional view of the chuck of FIG. 1 along line 2—2 thereof;

FIG. 9, parts A–E are side elevational views, drawn to a reduced scale and in partial section, of the chuck of the proceeding FIGS. threadably engaged upon a fragmentarily-illustrated mounting leg, with the parts of the Figure depicting sequential phases of operation; and FIG. 10, parts A–F are side elevational views, drawn to a further reduced scale, of the same chuck mounted upon a fragmentarily-illustrated overhead conveyor, with a bottle and a fragmentarily-illustrated underlying conveyor added thereto, and with the parts of the Figure depicting sequential phases of operation.

DETAILED DESCRIPTION OF THE ILLUSTRATED EMBODIMENTS

Figure 3:
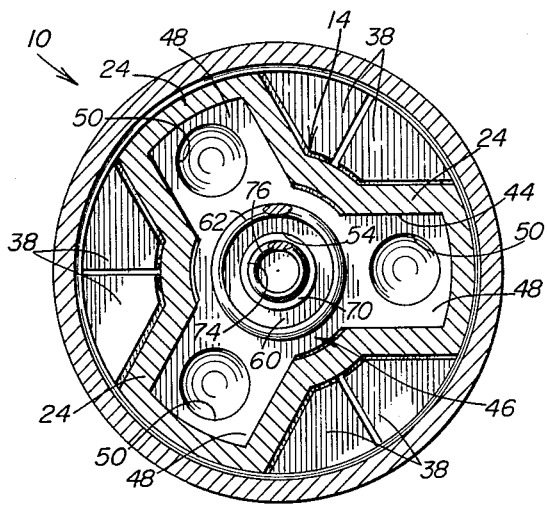
FIG. 3 is a sectional view of the chuck of the preceeding FIGS. taken along line 3—3 of FIG. 2.

Turning now in detail in FIGS. 1–8 of the appended drawings, therein illustrated is a chuck embodying the present invention, and including a shell, a cap and a hollow guide core, generally designated respectively by the numerals 10, 12 and 14. The shell 10 is generally cylindrical, and is provided with an internally threaded portion 16 adjacent its upper or inner end. It has a narrow, radially extending circumferential lip 18 adjacent its lower or outer end, which lip 18 provides an annular seating surface 20 and a bevelled outer face 22.

Figure 5:
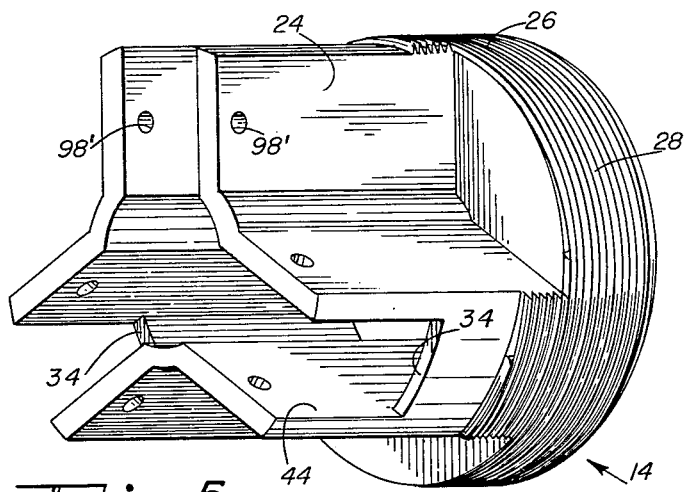
FIG. 5 is a perspective view of the guide core employed in the chuck.

The guide core 14 is of generally trilobate cross section, as is best seen in FIGS. 3 and 5; each of the equidistantly spaced lobes 24 extends radially to the shell 10 and has a corresponding externally threaded portion 26, by which the core 14 is engaged therewithin. The upper portion 28 of the core 14 is generally cylindrical, and extends upwardly beyond the shell 10 when the core 14 is fully threaded thereinto. The portion 28 is also externally threaded, thereby providing means for engaging the cap 12, which is generally cylindrical and has an internally threaded lower portion 30 to cooperate therewith. As can be seen in FIG. 2, when fully threaded into the shell 10, the core 14 has its lower end space a short distance above the annular seating surface 20; the lobes 24 having slots 34 extending upwardly from their bottom edge, which features enable the accommodation of shield inserts, generally designated by the numeral 36 and illustrated in FIG. 7, as will be described hereinafter.

Each shield insert 36 consists of a pair of shoulder elements 38 and a backing wedge element 40, to the opposite ends of which the shoulder elements 38 are affixed. In assembly, the inserts 36 are seated upon the annular seating surface 20 of the lip 18, with the wedge element 40 extending upwardly into the slot 34 of the corresponding lobe 24, and with the lower edges of the guide core 14 engaged in the channel 42 which are provided along the inner margins of the shoulder elements 38. Thus, tightening of the core 14 intothe shell 10 maintains the shield inserts 36 in desired fixed positions within the lower portion of the chuck; as will be appreciated, the inserts 36 serve to seal the lower end of the chuck against contamination, and also to prevent the entry of foreign objects thereinto.

Figure 6:
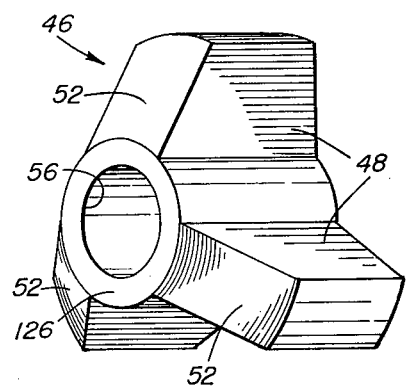
FIGS. 6 is a perspective view of the positioning member employed therein.
Figure 7:
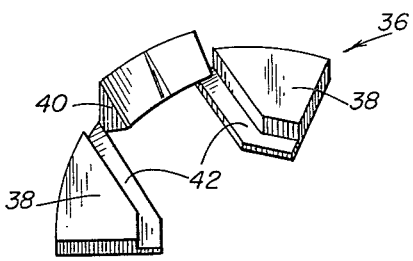
FIG. 7 is a perspective view of a shield insert employed therein.
Figure 8:
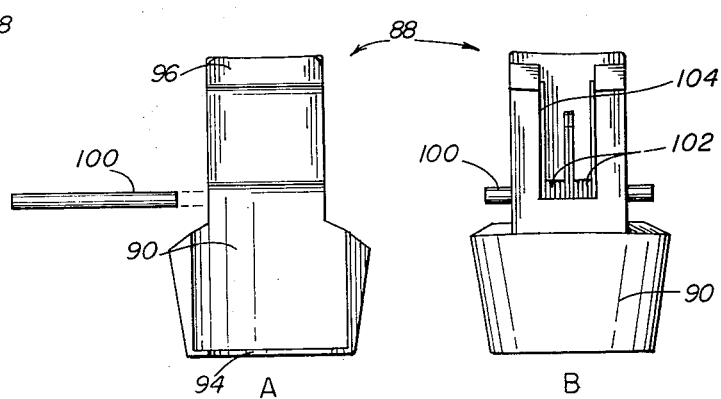
FIG. 8, parts A and B are, respectively, front and rear elevational views of a gripping member employed in the chuck, part A showing, in addition, a pivot pin aligned for insertion thereinto, and part B showing, in addition, a pivot pin and pair of springs mounted therein.

The trilobate configuration of the guide core 14 defines a Y-shaped passageway 44 in which is slidably received a Y-shaped positioning member, generally designated by the numeral 46, and most clearly illustrated in FIG. 6. Each arm 48 of the positioning member 46 is axially bored at 50 for the purpose of weight reduction, and has a downwardly tapered lower edge to provide a camming surface 52 thereon. The positioning member 46 also has an axial bore 54 and counterbore 56 of greater diameter, which cooperatively define an internal annular abutment surface 58. A short collar 60 extends upwardly about the bore 54, and provides a seat for the compression spring 62, which is mounted thereover with one end bearing upon the upper surface of the positioning member 46. The opposite end of the spring 62 is seated in a shallow circular recess 64 formed coaxially in the cap 12, and thereby urges the member 46 downwardly toward the lower end of the chuck.

Slidably received within the bores 54, 56 of the positioning member 46 is an actuator assembly, generally designated by the numeral 66. The assembly 66 consists of a cylindrical body 68, to the upper end of which is threadably engaged a bolt 70 and to the lower end of which is affixed a downwardly opening cup-shaped receiver 72. The bolt 70 is axially bored at 74 to seat one end of the compression spring 76, which has its opposite end bearing upon the cap 12 (in a manner to be more fully described hereinafter) to urge the assembly 66 downwardly toward the lower end of the chuck, and the bolt 70 has a head 78 at its upper end to limit travel of the assembly 66 into the positioning member 46. The receiver 72 has a disc 80 of resiliently deformable material secured to the upper wall defining the cavity 82 therewithin, and a conical set ring 84 is slidably mounted upon the body 68 to provided a downwardly tapering camming surface 86.

Figure 4:
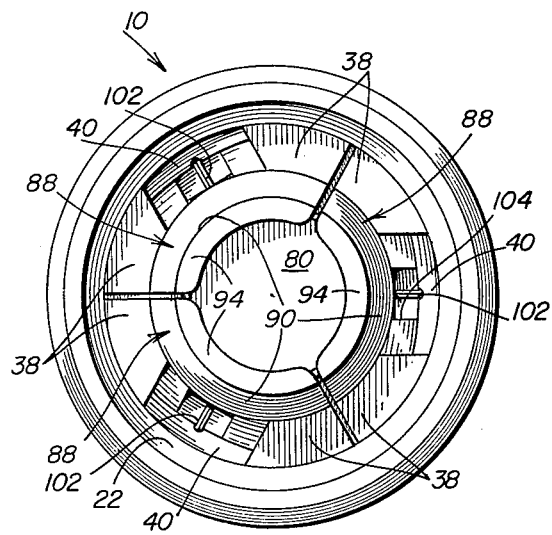
FIG. 4 is an outer end view of the chuck of the preceeding figures.

Equidistantly spaced about the actuator assembly 66 are three identical gripper members, each being generally designated by the numeral 88 and comprising a 120° curvilinear skirt portion 90 and an arm portion 92 extending angularly upwardly therefrom. Narrow flanges 94 extend inwardly from the lower edges of the skirt portions 90; as is best seen in FIGS. 1 and 4, the three flanges 94 cooperatively define a substantially complete collar for encirclement of the neck or crown of a bottle or similar article, to be gripped thereby. A pointer follower element 96 is provided at the end of the arm portion 92 of each gripper member 88, and a hold 98 extends transversely through each of the members 88 at approximately the juncture of the skirt and arm portions 90, 92 thereof.

Each gripper member 88 is pivotably mounted in one of the slots 34 of the core 14 by a pin 100, which passes through the hole 98 therein and has its ends engaged in holes 98' in adjacent walls of the core 14. A mirror-image pair of springs 102 are retained on each pin 100 within the shallow recess 104 formed in the rear surface of the corresponding gripper member 88, with one leg of each spring 102 engaging behind the follower element 96 and the other leg thereof bearing upon the wedge element 40 of the associated shield insert 36, to thereby urge the arm portions 92 of the gripper members 88 inwardly toward the axis of the chuck, and the skirt portion 90 thereof outwardly therefrom.

The cap 12 of the chuck has an upstanding hub portion 106 through which is provided a threaded opening 108 into an axial bore 110 of greater diameter. A retainer disc 112 having a short, centrally disposed depending lug 114 is seated within the upper end of the bore 110, and has the upper end of the spring 76 positioned over the lug 114; thus, the disc 112 serves both as a stop for the spring 76 and also as a closure for the opening 108. The large diameter O-ring 32 is retained within the joint between the shell 10 and cap 12 to provide additional protection against contamination.

Operation of the chuck is best described with reference to FIGS. 9 and 10, which illustrate the chuck in various phases of operation during a full cycle of engagement and release. FIG. 10 includes an overhead conveyor consisting of a track 116 on which runs a wheeled carriage 118; a threaded leg 120 depends from the carriage 118 and has its lower end engaged in the threaded opening 108 of the chuck cap 112, to mount the chuck for travel along the overhead conveyor. FIG. 10 also suggests an underlying belt conveyor 122 and a bottle 124 of the sort that is adapted for engagement by the chuck of the invention. As will be appreciated, in the latter Figure the gripper members 88 are not shown in true configuration or relationship to one another; this is done for the clarity of illustration. It should also be appreciated that the parts of FIGS. 9 and 10 having the same letter designation depict the same phase of operation of the chuck, and that parts A and F of FIG. 10 depict the same condition of the chuck, which occurs respectively at the commencement and conclusion of a cycle.

The chuck in part A of FIGS. 9 and 10 is in its open condition preliminary to insertion of the bottle 124, which is supported in axial alignment therebelow on the belt conveyor 122. The actuator assembly 66 is urged to its lowermost position by the spring 76, its downward travel being limited by engagement of the head 78 upon the collar 60 of the positioning member 46. The gripper members 88 are biased by the springs 102 to their open position against the bevelled outer face 22 of the shell 10, with the follower elements 96 thereof engaged under the lower end 126 of the positioning member 46, which bears downwardly thereon under the force of spring 62.

The chuck and bottle 124 proceed together to the position illustrated in part B of the Figures, during the course of which the bottle 124 is gradually elevated toward the chuck by the belt conveyor 122, which is inclined for that purpose. In so doing, the crown of the bottle 124 enters the cavity 82 of the receiver 72 (the free-floating set ring 84 facilitating self-alignment), with continued upward movement of the bottle 124 forcing the actuator assembly 66 (and, in turn, the set ring 84) upwardly within the chuck. Eventually, the upper end of the body 68 engages the abutment surface 58 of the positioning member 46, releasing the follower elements 96 of the gripper members 88 and permitting slight outward movement thereof by the set ring 84 against the force of springs 102.

As conveyance proceeds, the bottle 124 is forced more deeply into the chuck, until the belt conveyor 122 reaches its maximum elevation, shown in part C of the Figures. In that position, the upper edge of the set ring 84 has passed beyond the follower elements 96, which thereupon bear upon the tapered camming surface 86 of the ring 84.

The belt conveyor 122 declines from the position of parts C, releasing the upward thrust upon the actuator assembly 66 and, in turn, upon the positioning member 46. The springs 62, 76 thereupon urge the member 46 and assembly 66 downwardly; the positioning member 46 urges the set ring 84 downwardly, so that the camming surface 86 of the latter causes outward movement of the follower element 96 (and consequently, inward pivoting of the skirt portions 90) against the force of springs 102. With continued downward movement, the set ring 84 proceeds past the follower elements 96, which then engage the camming surfaces 52 of the corresponding arms 48 of the member 46, forcing the skirt portions 90 of the gripper members 88 into encirclement of the neck of the bottle 124, and causing the flanges 94 thereof to engage beneath the crown thereof. As shown in part D of FIGS. 9 and 10, the bottle 124 is thereby supported by the chuck, in which position it may readily be coated or otherwise dealt with, as may be desired. It should be noted that, in the supporting condition the actuator assembly 66 is independently forced downwardly upon the crown of the bottle 124, with the resilient disc 80 within the receiver 72 sealing the open end of the bottle 124; thus the entry of coating materials, water and the like into the bottle 124 is prevented, while the grip thereon is enhanced by the clamping action that is produced in cooperation with the flanges 94.

To effect release, the conveyor belt 122 is brought into contact with the bottom of the bottle 124, again forcing it upwardly into the chuck. The consequential elevation of the positioning member 46 permits inward pivoting of the follower elements 96 over the camming surfaces 52, and disengagement of the flanges 94 from beneath the bottle crown. In this phase of operation, the belt 122 raises the bottle 124 only to the point at which the follower elements 96 just clear the positioning member 126 so that, upon reaching that juncture, the pointed tips of the follower elements 96 snap between the member 46 and ring 84, to achieve the relationships depicted in part E (spacing being exaggerated in FIG. 9 for clarity). Thereafter, further downward movement of the movement 46 is restrained by the gripping members 88, and the various other parts of the mechanism reassume the positions shown in parts A and F. As suggested by part F of FIG. 10, the bottle 124 may then be transported on the belt conveyor 122 for unloading or further handling.

As has been suggested, the chuck described herein is especially well-suited for the transport of bottles and similar containers, such as to carry a line of them through various processing stations. More particularly, techniques have recently been developed for the coating of glass bottles by electrostatically depositing solid particles of synthetic resinous materials thereon, which materials may subsequently be fused to provide a unified, coherent, protective film for the bottle. Supporting the bottle by its neck or crown, as illustrated in FIG. 10 of the drawings, not only exposes for such coating the entire body of the bottle, but also serves to mask the crown, as is desirable due to the interference that a coating thereon would tend to present to effective capping. Since further benefit is realized if the coated and uncoated areas are blended into one another, rather than sharply defined, the chuck may be configured to produce a feathered or indistinct border. Furthermore, heat effects may be employed to the same end; thus, if the bottle were heated and supported by a chuck constituting an effective heat sink (or, indeed, a cooled chuck), a temperature gradient would occur adjacent the supported part of the bottle, creating a smooth transition into the uncoated crown area by virtue of differences in electrical properties or in the and of heat available to fuse annd thereby cause adhesion of thermoplastic particles.

Notwithstanding the foregoing, it should be understood that applications for the instant chuck are by no means limited to the transport of containers in systems demanding in-line actuation. Thus, the mechanism disclosed can be used in any situation or application in which a holdopen, snap-shut device is required, such as for the automatic loading and unloading of tools, assemblies, atomic reactor control rods, etc. Other exemplary applications include, with appropriate modification where necessary, use in quickdisconnect electrical pneumatic, hydraulic, or purely physical connecting or latching devices; as electrical sockets for non-threaded bulbs, fuses, and the like; as receptacles for the suspension of various items requiring rapid or frequent replacement; etc. It will be appreciated that the term "chuck" as used herein is intended to encompass any manner of holding device, and that the term "article" is intended to include any of the various fixtures which may cooperate with the chuck to provide, for example, a coupling device.

Numerous modifications may be made to the chuck described specifically herein without departing from the scope of the invention, as has been suggested hereinabove. For example, it will be appreciated that, in the embodiment disclosed, movement of the setting member or set ring occurs in part under the force of gravity; in a version intended for horizontal or inverted operation, the setting member may be spring-loaded to produce the desired action. Moreover, the configurations, relationships and quantities of the several parts may be altered to achieve modified operation or to adapt the mechanism for specific uses.

Thus, it can be seen that the present invention provides a novel chuck-like device which is responsive to force in a single direction to effect both engagement and release of an article thereby. The device is especially adapted to securely suspend a bottle or similar container, while effectively sealing the opening of the container against contamination. It is moreover, adapted for mounting on an overhead conveyor to automatically accept upstanding articles from an underlying supporting surface, and to thereafter release them thereto. The chuck may itself be substantially sealed against the entry of contaminants and foreign objects thereinto, and it is adapted to simple and inexpensive construction and convenient and economical utilization.

Having thus described the invention, I claim:

1. A chuck-like device comprising, in combination: a body; an outwardly biased actuating member mounted for reciprocation relative to said body between outward and inward positions, and having outwardly disposed article-engaging means thereon; at least one gripping member mounted on said body for pivotable movement about an axis generally perpendicular to the axis of reciprocation of said actuating member, said gripping member having a gripping element thereon disposed outwardly of said axis of pivoting for movement between an open position away from said article-engaging means and a closed position adjacent thereto, and also having a follower element thereon spaced inwardly of said axis of pivoting, said gripping member being biased toward said open position of said gripping element; an outwardly biased positioning member mounted for reciprocation between outward and inward positions and having an outwardly tapered first camming surface thereon, said first camming surface being disposed to engage said follower element of said gripping member and to urge said gripping element into said closed position thereof, when said positioning member is in said outward position thereof; a setting member mounted outwardly of said positioning member for inward and outward reciprocation, said setting member having an outwardly tapered second camming surface thereon disposed to engage said follower element of said gripping member and being generally contiguous to said first camming surface when said positioning and setting members are adjacently disposed, said actuating member having means for engaging and moving inwardly said positioning member and said setting member upon inward movement thereof, and said camming surfaces being adapted, when contiguously disposed, to permit said follower element to pass readily from said second surface to said first surface; so that, with said positioning member in said outward position thereof and said gripping element in said closed position thereof, inward movement of said actuating member to a first position from said outward position thereof causes engagement and inward movement of said positioning member and said setting member, in turn permitting said gripping member to pivot to said open position of said gripping element, and so that further inward movement of said actuating member to a second position causes further inward movement of said positioning member and said setting member, and thereby causes said follower element to engage and bear upon said second camming surface, whereupon outward movement of said actuating member will permit said positioning member to return to said outward position thereof, with said follower element passing from said second to said first camming surface, and with said gripping element returning to said closed position thereof.

2. The device of claim 1 wherein said device includes a plurality of said gripping members, and wherein said first and second camming surfaces are disposed to engage said follower elements thereof.

3. The device of claim 1 wherein said follower element is directed toward said axis of reciprocation, and is pointed to facilitate its entry between said first and second camming surfaces.

4. The device of claim 1 wherein said gripping member rests upon said body in said open position of said gripping element, with said body restraining further opening movement of said member.

5. The device of claim 1 wherein said positioning member rests upon said follower element of said gripping member in said open position of said gripping element, and wherein said engaging and moving means of said actuating member engages and moves said positioning member to release said gripping member, prior to moving said setting member past said follower element.

6. The device of claim 2 wherein said article-engaging means is disposed at the outer end of said actuating member, and wherein, in said closed position thereof, said gripping members extend below said article-engaging means toward the axis of reciprocation of said actuating means.

7. The device of claim 6 wherein said article-engaging means includes a resiliently deformable element outwardly disposed thereon and adapted to seal an open-ended container engaged thereby.

8. The device of claim 1 wherein said positioning member and said setting member are slidably mounted upon said actuating member.

9. The device of claim 8 wherein said actuating member, positioning member and setting member are of generally circular cross section.

* * * * *